United States Patent

[11] 3,632,891

[72] Inventors Bruno Basini; Ignazio Caroli, both of Rome, Italy
[21] Appl. No. 870,022
[22] Filed Oct. 28, 1969
[45] Patented Jan. 4, 1972
[73] Assignee Selenia-Industrie Elettroniche Associate S.p.A. Naples, Italy
[32] Priority Dec. 12, 1968
[33] Italy
[31] 41930A/68

[54] CIRCUIT ARRANGEMENT FOR THE INSERTION OF TELEPHONE CHANNELS IN THE INTERMEDIATE FREQUENCY JUNCTIONS FOR REPEATER STATIONS
3 Claims, 1 Drawing Fig.

[52] U.S. Cl. .......... 179/41 A, 179/15
[51] Int. Cl. .......... H04j 1/10
[50] Field of Search .......... 179/41 A, 15 BZ, 15 BD; 325/3, 9–11

[56] References Cited
UNITED STATES PATENTS
3,180,938 4/1965 Glomb .......... 179/15 BD
3,369,180 2/1968 Renkowitz .......... 325/11

*Primary Examiner*—Ralph D. Blakeslee
*Attorney*—Wenderoth, Lind & Ponack

ABSTRACT: A circuit arrangement for the insertion of additional communication channels such as telephone channels and the like in the intermediate frequency junctions of the relaying stations, wherein the intermediate frequency signal, coming from the receiver of the station, is applied to a first frequency converter associated to a first conversion oscillator, said first converter being coupled through a band pass filer to a second frequency converter associated to a second conversion oscillator, wherein at least one of said conversion oscillators can be modulated by the signals of the channels to be added, and at least one of the two conversion oscillators is controlled by the error signal coming from a phase detector piloted by the signal coming from a first and a second frequency divider respectively connected to the input to, and the output from the system.

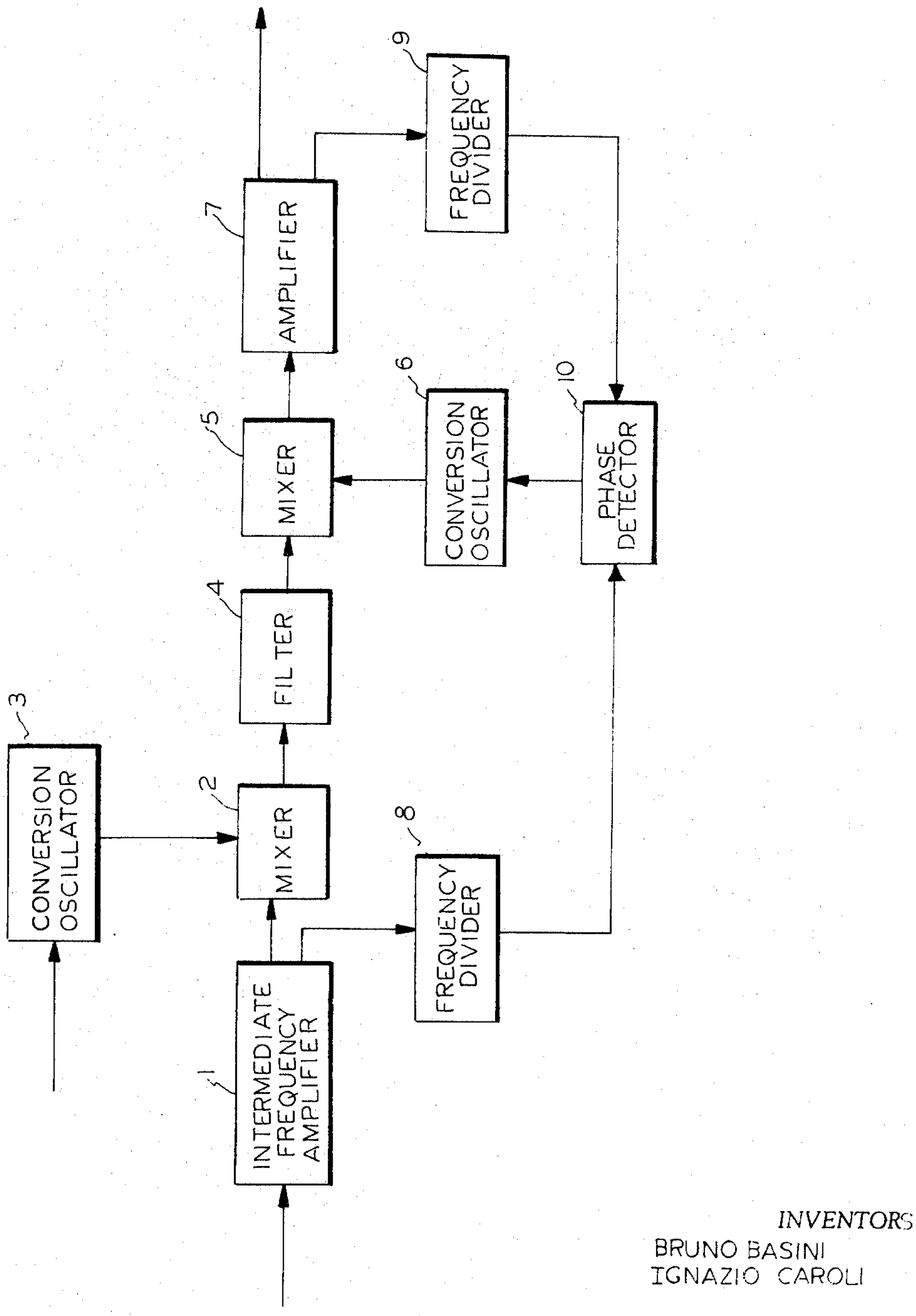
INVENTORS
BRUNO BASINI
IGNAZIO CAROLI
BY Wenderoth, Lind & Ponack
ATTORNEYS

CIRCUIT ARRANGEMENT FOR THE INSERTION OF TELEPHONE CHANNELS IN THE INTERMEDIATE FREQUENCY JUNCTIONS FOR REPEATER STATIONS

The present invention relates to a circuitry for the insertion of telephone channels in intermediate frequency junctions for repeater radio stations.

More particularly the present invention relates to a circuit arrangement for the insertion of auxiliary communication channels in the intermediate frequency chain in the repeater stations of high-capacity radio links.

Various systems have been devised for the insertion of telephone channels in relaying radio stations. The systems known up to now do not allow, however, a great number of channels to be inserted, and according to the various kinds of solutions they will originate various kinds of drawbacks limiting their possibility of use. Particularly, in the known systems for the insertion of telephone channels in a relaying station, the local oscillator of the transmitter will be phase or frequency modulated.

Now, as the interface features of the local oscillator are submitted to no rule, like the features of the other subunits of the relaying stations, any system of insertion of additional channels into a relaying radio station ("insert" operation) based on the modulation of the transmission local oscillator, will be unavoidably bound to that determined kind of apparatus for which it has been planned, and with the further complication deriving from the variability of the frequency of the local oscillator depending upon the operation frequency and the selected channel, which imposes, each time, the selection of the quartz and the corresponding dimensioning of the circuits.

According to the present invention, in order to obviate the above-related drawbacks, the insertion of the additional channels is made into the intermediate frequency circuit inserted between the receiver and the transmitter of the relaying radio station. In fact, at that point the operative frequency, the levels of the signal and the actual impedances are governed by internationally accepted rules, and therefore a device for inserting additional channels embodied according to such a criterion might have a universal use, and might be applied also on already existing plants from any provenience.

More particularly, according to the present invention, the circuital arrangement for the insertion of additional telephone channels will be effected in the intermediate frequency channel by carrying out two subsequent frequency conversions: wherein a first conversion oscillator is phase or frequency modulated by the signal to be inserted, and a second conversion oscillator is controlled by an error signal coming from a phase detector to which the input and output signals arrive (at the same assigned frequency) of the intermediate frequency unit after having being frequency demultiplied so as to practically remove the angular displacements due to the modulation of the two compared signals.

The circuital arrangement according to the present invention will be now described with reference to an embodiment thereof at present preferred, disclosed by way of nonlimitative example and with reference to the attached drawing which shows the block diagram thereof.

With reference to the drawing, the intermediate frequency signal coming from the receiver of the relaying radio station, for instance at the standard frequency of 70 MHz is carried to an intermediate frequency amplifier 1, connected to the mixer 2 to which arrives the signal from a first conversion oscillator three phase-, or frequency-modulated by the signal of the channels to be inserted. The conversion oscillator 3 in one embodiment can operate the frequency of 570 MHz in order to obtain a signal at the assigned frequency of 500 MHz which will be caused to pass through a band pass filter 4 centered on this frequency.

The signal coming from the filter 4 is carried to a second mixer 5 to which comes the signal from a second conversion oscillator 6 operating at the frequency of 430 MHz in order to obtain at the output from the mixer 5 a signal at the assigned frequency of 70 MHz which will be amplified in the amplifier 7 and sent to the transmitter of the relaying station.

For the long term stabilization of the operating frequencies of the unit, the signal coming from the intermediate frequency amplifier 1 as applied to a frequency divider 8 having for instance a $10^6$ division ratio; and the signal coming from the intermediate frequency amplifier 7 is also applied to a frequency divider 9 having the same division ratio as the frequency divider 8. The division ratio will have to be selected so as to have at the output from the dividers a signal with a frequency lower than the lowest frequency which modulates the signals applied to the input of the dividers themselves so as to practically remove the angular displacements due to modulation.

The outputs from the frequency dividers 8, 9 are carried to a phase detector 10 which produces an error signal which controls one of the two conversion oscillators, for instance the oscillator 6.

Therefore, the output signal (from the amplifier 7) carrying the double modulation of the transit channels and of the inserted channels will be phase-locked in long term to the input signal (at intermediate frequency). The overall frequency stability of the system, accordingly will not be degraded by the insertion operation of the additional channels. If desired or convenient it will be possible to apply the modulation for the additional channels to both the conversion oscillators or it will be possible to subdivide said modulation between these oscillators.

It is also to be noted that due to the stability of the unit according to this invention, this unit could also be utilized as a terminal modulator by substituting a signal coming from an oscillator at the nominal frequency of 700 MHz for the input at intermediate frequency on the amplifier 1.

The present invention has been described in one preferred embodiment, being however understood that changes of embodiment could be practically entered without departing from the scope of the present industrial privilege.

Having thus described the present invention, what is claimed is:

1. In a circuital arrangement for the insertion of additional communication channels such as telephone channels and the like in the intermediate frequency junctions of repeater stations comprising a first mixer, an intermediate frequency amplifier connected to said first mixer, a first frequency conversion oscillator providing an oscillation angle modulated with the information of the communication channels to be inserted, said first frequency conversion oscillator being connected to said first mixer, a second mixer a band pass filter connected between the output of said first mixer and the input of said second mixer, a second frequency conversion oscillator connected to said second mixer, an output amplifier connected to the output of said second mixer, a first frequency divider whose input is connected to the output of said intermediate frequency amplifier, a second frequency divider connected to the output of said output amplifier, a phase detector, the output of said frequency dividers being connected to the inputs of said phase detector, the output of said phase detector being connected to a frequency control input of said second conversion oscillator, whereby said frequency dividers remove the angle modulation from the signals due to useful information to obtain a long term frequency stability of the output signal.

2. A circuital arrangement according to claim 1 in which both oscillators are modulated by the signal of the channels to be inserted.

3. A circuital arrangement according to claim 1, in which the output of said phase detector is fed to both oscillators.

* * * * *